United States Patent [19]

Rockstedt

[11] Patent Number: 5,267,788
[45] Date of Patent: Dec. 7, 1993

[54] MULTI-SCREW, CONTINUOUS MIXING AND KNEADING MACHINE WITH POLYGONAL KNEADING ELEMENTS FOR PLASTICIZABLE COMPOUNDS

[75] Inventor: Siegward Rockstedt, Schalkenbach, Fed. Rep. of Germany

[73] Assignee: Farrel Corporation, Ansonia, Conn.

[21] Appl. No.: 856,126

[22] Filed: Mar. 23, 1992

[30] Foreign Application Priority Data

Jan. 31, 1992 [DE] Fed. Rep. of Germany ....... 4202821

[51] Int. Cl.$^5$ ............................................. B01F 7/08
[52] U.S. Cl. ........................................ 366/85; 366/81; 366/90; 366/301; 366/319; 366/321; 366/324; 425/204; 425/208
[58] Field of Search ............... 425/201, 204, 208, 209; 366/66, 76, 81–85, 88–90, 96–99, 297, 299, 300, 301, 318, 319, 321–324; 100/145; 198/662, 664, 665, 669, 676

[56] References Cited

U.S. PATENT DOCUMENTS

| | | | |
|---|---|---|---|
| Re. 23,948 | 2/1955 | Fuller | 425/204 X |
| 2,519,014 | 8/1950 | Bankey | 425/208 |
| 3,008,184 | 11/1961 | Fritsch | 425/208 X |
| 3,154,808 | 11/1964 | Ahlefeld, Jr. et al. | |
| 3,224,739 | 12/1965 | Schuur | 425/204 X |
| 3,421,182 | 1/1969 | Colombo | 425/204 |
| 3,632,256 | 1/1972 | Kasting et al. | 425/208 X |
| 4,007,922 | 2/1977 | Tamura | 366/81 |
| 4,352,568 | 10/1982 | Lohr et al. | 366/84 |
| 4,712,992 | 12/1987 | Kim | 366/79 X |

FOREIGN PATENT DOCUMENTS

| | | | |
|---|---|---|---|
| 1014735 | 8/1957 | Fed. Rep. of Germany. | |
| 1679884 | 8/1971 | Fed. Rep. of Germany. | |
| 2058642 | 5/1972 | Fed. Rep. of Germany | 425/208 |
| 2452994 | 4/1976 | Fed. Rep. of Germany. | |
| 2148620 | 3/1973 | France. | |
| 52-856 | 1/1977 | Japan | 366/81 |
| 54-65765 | 5/1979 | Japan | 366/79 |
| 55-6410 | 2/1980 | Japan | 366/85 |
| 55-139242 | 10/1980 | Japan | 425/208 |
| 59-73931 | 4/1984 | Japan | 366/79 |
| 60-24912 | 2/1985 | Japan | 366/83 |
| 931590 | 7/1963 | United Kingdom | 366/319 |

*Primary Examiner*—Harvey C. Hornsby
*Assistant Examiner*—Charles Cooley
*Attorney, Agent, or Firm*—Parmelee, Bollinger & Bramblett

[57] ABSTRACT

Multi-screw, continuous mixing and kneading machine for plasticizable compounds with screws, which rotate in a housing and which penetrate the cylindrical housing section, enclosing the screw concerned, and exhibit feed and discharge zones and intermediate melting, mixing and kneading zones, where the feed and discharge zones are formed by intermeshing screws that rotate in the same direction, and kneading elements are disposed in the melting, mixing and kneading zones. The kneading elements comprise axially extended polygons, whose surfaces are approximately flat and whose edges travel by one another with small clearance relative to the envelopes of the respective other polygon so as not to intermesh while rotating, where the edges of the housing section enveloping them maintain a distance that is significantly greater than the clearance.

19 Claims, 4 Drawing Sheets

MULTI-SCREW, CONTINUOUS MIXING AND KNEADING MACHINE WITH POLYGONAL KNEADING ELEMENTS FOR PLASTICIZABLE COMPOUNDS

FIELD OF THE INVENTION

The invention relates to a multi-screw, continuous mixing and kneading machine for plasticizable compounds with screws, which rotate in a housing and which penetrate the cylindrical housing section enclosing the screws concerned and exhibit feed and discharge zones and intermediate melting, mixing and kneading zones, where the feed and discharge zones are formed by intermeshing screws that rotate in the same direction, and kneading elements are disposed in the melting, mixing and kneading zones.

BACKGROUND OF THE INVENTION

Such a machine is known from the DE-AS 1 679 884. For this machine the kneading elements are designed as intermeshing kneading disks, which are usually provided with two or three axially extending edges. These relatively narrow kneading disks induce severe shear and thus intense development of heat in the material to be processed owing to the intermeshing of the kneading disks. Owing to the high shear concentrating on an axially relatively short region, the result is frequently high, temperature peaks, which involve the risk of thermal damage to the material concerned, when the operating parameters of the machine are not set and monitored especially accurately and carefully.

BRIEF SUMMARY OF THE INVENTION

The invention is based on the problem of designing the melting, mixing and kneading process in such a manner that high temperature peaks are virtually ruled out. This problem is solved by the invention in that the kneading elements comprise extended polygons, whose surfaces are approximately flat and whose edges travel by one another with small clearance so as not to intermesh while rotating, where the inner wall of the housing section enclosing said edges maintain a distance that is significantly greater than the clearance.

DETAILED DESCRIPTION OF THE INVENTION

The non-intermeshing, axially extended polygons provide in interaction with the housing section concerned in the region of the surfaces of the polygons axially extending chambers, where a conservative kneading effect is produced when one edge of the polygon travels by the adjoining screw, since the edge penetrates somewhat into the chamber and thus pushes aside the material, which is conveyed and contained in the chamber, without the material having to absorb especially high shear forces. To generate the totally necessary kneading effect, the extended polygon is designed suitably long, a feature that does not cause an engineering problem due to its shape. Expediently the length of the polygons is greater than the diameter of their envelopes. The low shear stress of the material is attained in essence in that the polygons do not intermesh and travel by one another with small clearance. Owing to the significantly greater distance of the edges of the polygons from the housing section concerned as compared to the clearance, the result is an adequately large free cross section for the requisite throughput of material in the direction of the discharge zone. Thus, relative to this region, the surface of the housing section is suitably large, a feature that has a good effect on the optionally necessary introduction of heat from the housing section.

Compared to the known kneading disks, the shear velocity generated with the effect of the polygons is significantly less, a feature that leads to a correspondingly reduced heat buildup in the material to be processed, when it is conveyed along the polygons. It is achieved in the region of the chambers formed by the polygons with the housing section concerned despite a high mixing effect, since the residence time of the material in these chambers is relatively long, in any case longer than the residence time in the free spaces concerned at the known narrow kneading disks, since they leave only relatively small free spaces owing to their intermeshing, so that the material to be processed is forced rapidly past the kneading disks. The long residence time of the material next to the polygons leads thus to a mixing in the chambers concerned that repeats itself often, without resulting in an especially high buildup of heat, in particular thermal peaks.

The introduction of heat in the region of the polygons can be obtained in the known manner with heating elements attached to or in the housing. Additional heat introduced thus into the material is more economical to produce than the heat that is generated in the material by high shear and which stems from a correspondingly necessary power of the drive machine. The resulting torque leads to a corresponding wear. In addition, experience has shown that owing to the temperature peaks, which is produced through high shear, the heat generated thus must be subsequently dissipated through cooling, in order to protect the material against damage. This risk is largely eliminated with the machine according to the invention, since, on the one hand, as stated, the heat produced in the material with the kneading effect is relatively low and, on the other hand, the heat introduced from the outside can be readily metered in such a manner that there is no risk of the material being damaged. Thus, for the machine of the invention, in particular when a necessary cooling is taken into consideration, the result is a totally lower energy supply at the same throughput as compared to machines using known kneading disks.

It should also be pointed out that with respect to a non-intermeshing twin screw extruder it is known from the DE-AS 1 014 735 to provide kneading elements, which comprise per screw coaxial cylindrical rollers with planar flattenings arranged on opposing sides, between the outlet opening of the machine and the screws. The diameter of the rollers is smaller than the inner diameter of the screw housing. Due to the non-intermeshing of the screws and the resulting non-overlapping of the walls of the two screw housings that form the inner cylinders (the inner cylinders touch precisely in the central region between the screws) the result of the decrease in the diameter of the rollers with respect to the inner diameter of the screw housing concerned both in the outer region of the screw housing and also in the central region between the rollers is a distance on the outside in the direction of the screw housing and on the inside in the direction of the opposing roller, where in the region between the rollers the distance from flattening to opposing flattening is twice as large as the distance between one flattening and the outer region of the screw housing. This means that in operation the flattenings of the opposing rollers that travel by on another are as large as the present distance, namely twice as large as the distance of the flattening situated on the outside at the time opposite the screw housing so that the kneading effect in this region that is especially important for the kneading is decisively reduced ant thus its intensity is virtually lost.

Apart from this ,the cited document also discloses only kneading elements in the usual short length, which is significantly less than the diameter of the screws.

The edges of the extended polygons can be oriented axis-parallel. In this case the result is a component that can be produced in a simple manner from an engineering point of view. However, it is also possible to tilt the edges of the extended polygons, namely allow them to extend in particular at such a small angle relative to the axial direction of the screw concerned that the edges extend only over a fraction of a complete course of a thread. If the edges of the adjoining polygons travel in the same direction, rotating the screw produces advancing approximation regions of the opposing edges of the polygons, which induce a shear that travels along the edges, where the material is subjected thus on a longer path to instantaneous shear and thus to a specific mixing effect. Thus, the relatively high residence time in the region of the polygons remains preserved, where, however, the material is treated especially uniformly with the traveling shear.

To keep the mixing chambers, formed next to the surfaces of the polygons, constantly filled, baffles are provided expediently directly behind the polygons. Short screws with interrupted back feed thread have proven to be especially suitable as baffles. Where the thread is interrupted, the material can flow over from one course of the thread into the other source of the thread.

The extended polygons are expediently designed as a radially symmetrical, equilateral polygon, so that each polygon surface behaves in the same manner with respect to the housing wall and the respective other polygon. In so doing, a polygon which is hexagonal in cross section has proven to be especially advantageous, since as regards processing technology this polygon yields good throughput cross sections for the transport of the material to be processed.

BRIEF DESCRIPTION OF THE DRAWINGS

The figures show embodiments of the invention.

DESCRIPTION OF THE PREFERRED EMBODIMENTS

Figure 1:
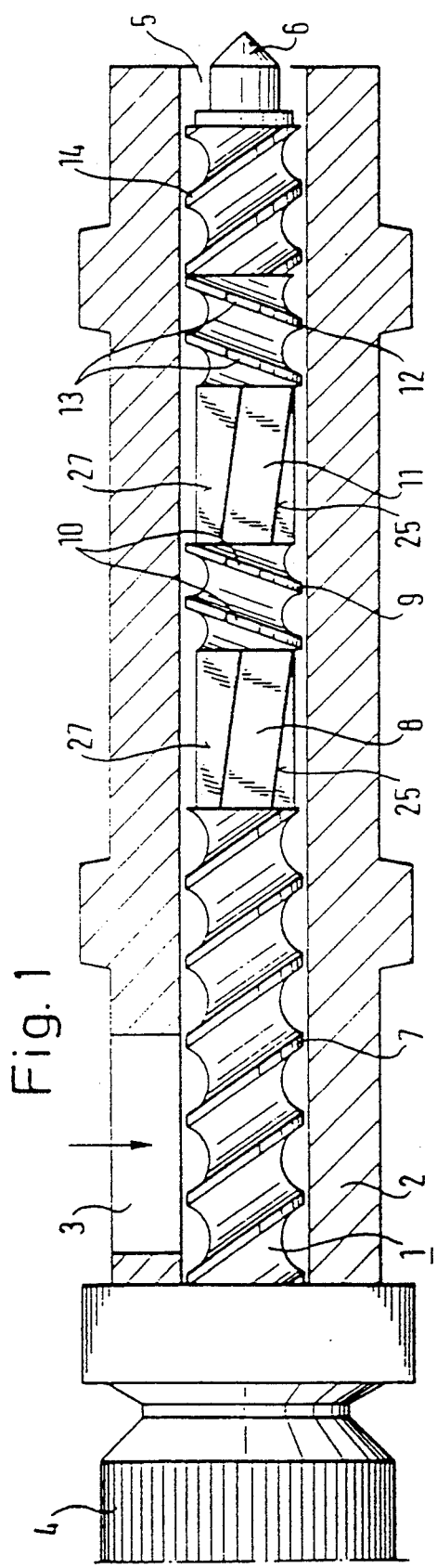
FIG. 1 is a side view of a twin screw mixing and kneading machine.

FIG. 1 shows a twin screw mixing and kneading machine, and in particular in a side view, so that only the one screw 1 of the machine can be seen. Screw 1 is disposed in the schematically drawn housing 2. Housing 2 has the inlet opening 3 for the feed of the material to be processed. On the left end of the housing 2 the drive unit 4 is drawn. The right end of the housing 2 has the outlet 5, which is penetrated by the screw tip 6. Thus, it is the conventional design of a twin screw mixing and kneading machine.

In the region of the inlet opening 3, the screw 1 has the transport screw 7, followed by the axially extended polygon 8. Polygon 8 is followed by a relatively short screw 9 with screw thread, contrarotating relative to screw 7, so that the screw 9 acts as the baffle. Both illustrated thread courses of screw 9 have the two interruptions 10, in order to allow the necessary throughput in the region of the screw 9 despite its baffle effect. Screw 9 is followed by another polygon 11, followed by, as provided after polygon 8, screw 12, acting as a baffle in the opposite direction, with interruptions 13, so that both polygon 8 and polygon 11 work against the effect of screws 9 and 12. The discharge screw 14, which feeds the processed material conveyed to it to the outlet 5, forms the end of screw 1.

Figure 2:
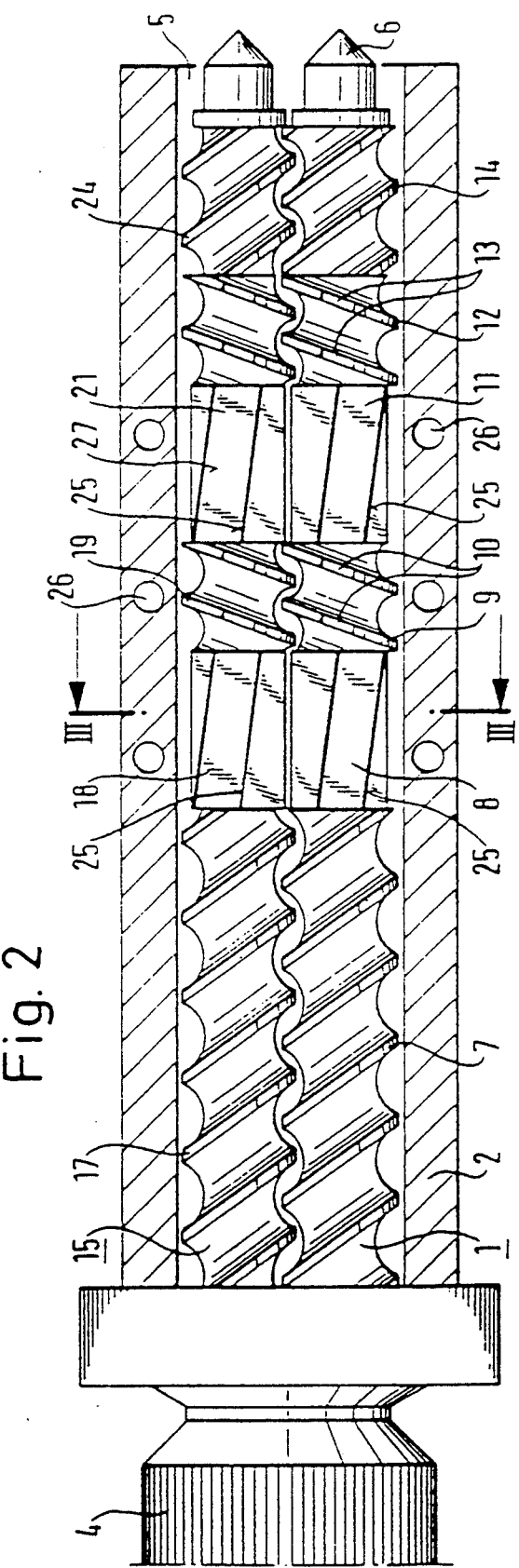
FIG. 2 is a top view of the same machine.

FIG. 2 is a top view of the twin screw mixing and kneading machine according to FIG. 1. Next to the screw 1 is the second screw 15, which is driven together with screw 1 in the same direction of rotation by the drive unit 4. The screw 15, constructed in the same manner as screw 1, is provided in the region of the inlet opening 3, not visible in FIG. 2, with the transport screw 17, which meshes with the threads of the transport screw 7 and vice versa. Thus, it involves known intermeshing screws 7 and 17, which are driven in the same direction and which owing to their intrinsic function transport the material, fed via the inlet opening 3, from left to right. In so doing, the material is conveyed into the region of polygons 8 and 18, further to the baffles 9 and 19, further to the polygons 11 and 21 and finally via the discharge screws 14 and 24 to the outlet 5.

In the region of polygons 8 and 18 and 11 and 21 the material transported in by the transport screws 7/17 is thoroughly kneaded along edges 25, since during the rotation of screws 1 and 15 the edges 25 travel by the surfaces 27 or edges 25 of the opposing polygon; and thus the supplied material is thoroughly kneaded in the manner already described above. At his points the process is described with the accompanying FIGS. 3 and 4. Housing 2 comprises two adjoining and substantially cylindrical housing sections having inner walls 28 within which the polygons are disposed. The polygons 8/18 and 11/21 extend over a relatively long length within the entire machine, so that the heat generated in the material to be processed during kneading is distributed over a suitable length; and thus thermal peaks generated in a narrow space are avoided. Eventually additionally required heat can be supplied by the bores 26, which guide a suitable heat transfer medium and which are provided in housing 2.

Figure 3:
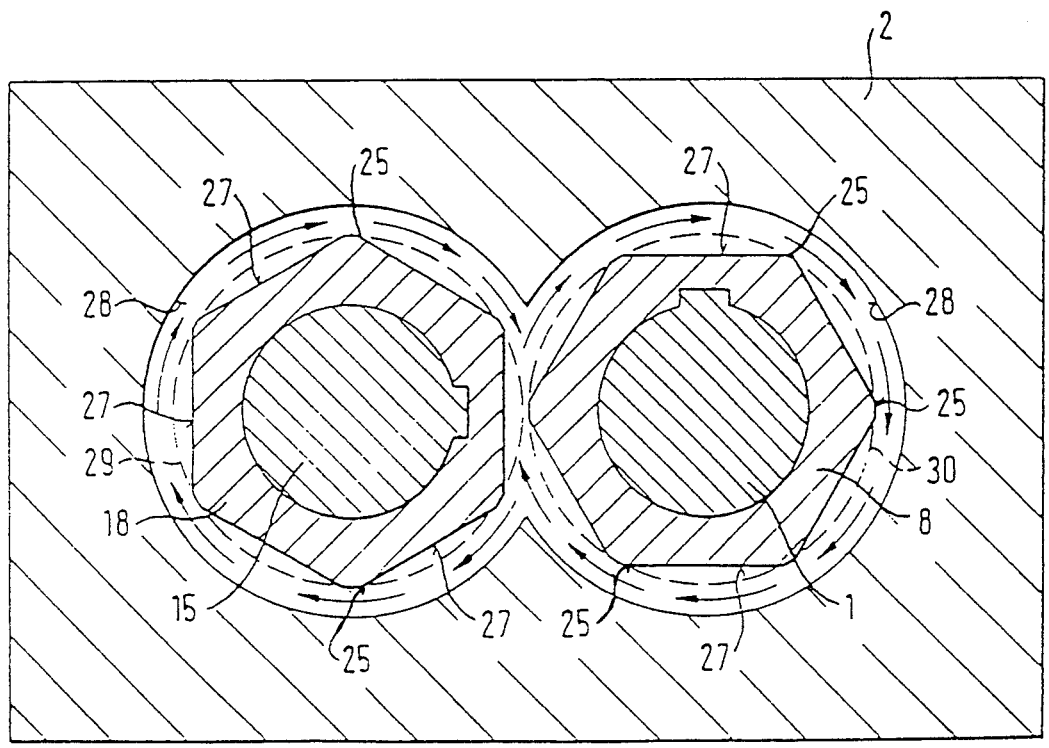
FIG. 3 is a cross sectional view of the machine along line III—III of FIG. 2 with both screws being set at such an angle that the edge of one polygon is opposite the surface of the other polygon.
Figure 4:
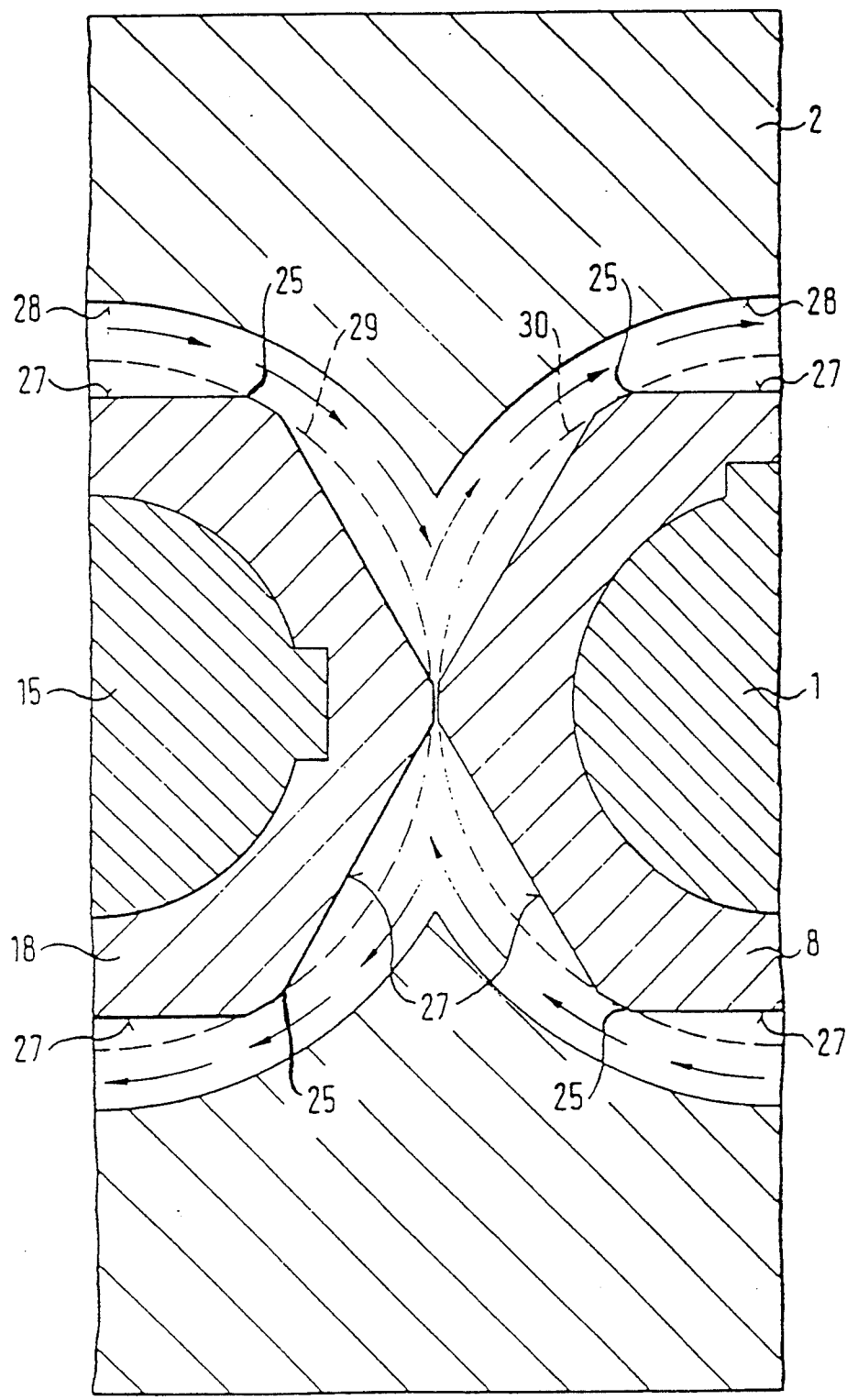
FIG. 4 is a corresponding (enlarged) sectional view as in FIG. 3, but with both polygons set at different angles.

FIGS. 3 and 4 are cross sectional views along line III—III from FIG. 2, where for the presentation in FIG. 3 a setting of the two screws 1 and 15 is selected at such an angle relative to each other that during rotation of the two screws one edge 25 travels by one polygon surface 27. In the arrangement according to FIG. 4, this setting of the two screws 1 and 5 is selected differently, namely in such a manner that here two edges 25 of both opposing polygons approach one another. In so doing, in both the arrangement according to FIG. 3 and FIG. 4, the envelopes 29/30 of the two polygons 8 and 18 maintain a play with respect to each other that is significantly less than the distance of the edges 25 from the inner wall 28 of the housing 2. In other words, during rotation of polygons 8, 18, edges 25 circumscribe envelopes 29, 30 which do not overlap during the rotation such that a clearance is maintained between the polygons. The radial distance between edges 25 and inner walls 28 of the housing sections of housing 2 is significantly greater than this clearance.

In both the arrangement according to FIG. 3 and that according to FIG. 4 there is in the region between the two polygons 8 and 18 a pronounced kneading effect on the intermediate material, where, however, this kneading effect extends along the polygons over a relatively large distance (see FIG. 2), so that the kneading operation proceeds relatively conservatively for the material to be processed. If the edges 25 of the polygons are at a small angle to the respective axial direction, as shown in FIG. 2, the result is a kneading effect traveling along the respective polygon as a consequence of the axial shifting of the approach region of the respective edge 25, which at this time is opposite the other polygon. The kneading effect is thus generated along the material put through, a feature that has an especially good effect on the mixing of various supplied materials.

The kneading operation shall be explained once again in the following. It is apparent from FIGS. 3 and 4 that the two envelopes 29 and 30 of the two polygons 8 and 18 do not overlap, thus providing that a relatively small play, in which the kneading operation takes place in essence, remains between edge 25 and the polygon surface 27. In so going, the material to be processed is subjected, according to the drawn arrows, to a specific shear, which stems from the rotation of the two polygons 8 and 18 in the same direction, where, however, in the region of the clearance existing between the two polygons the respective opposing edges 25 or polygon surfaces 27 travel by one another in the opposite direction.

Figure 5:
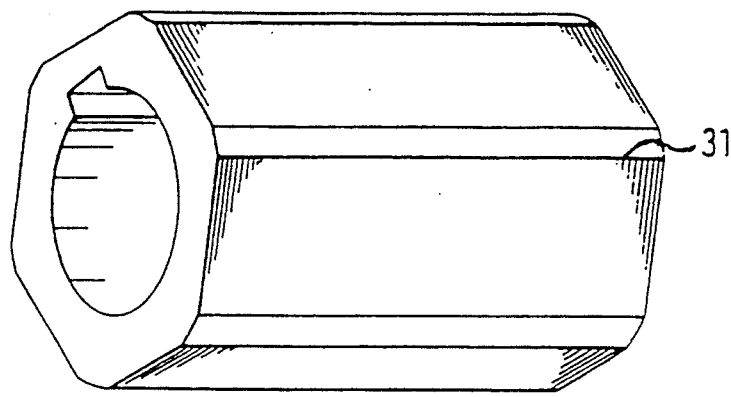
FIG. 5 is a perspective view of a polygon having edges which are parallel to the axis of rotation according to one embodiment of the invention.
Figure 6:
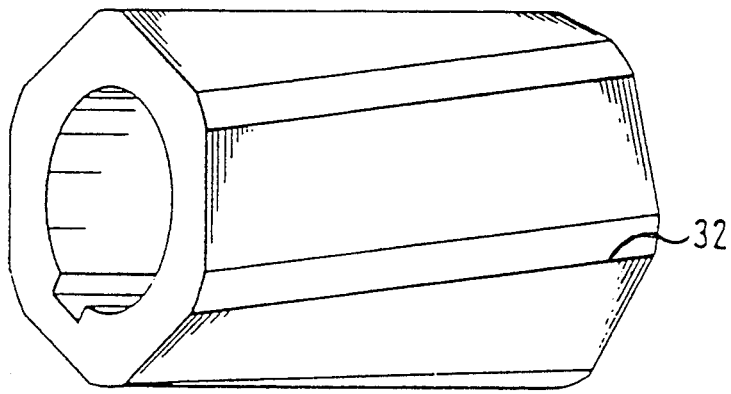
FIG. 6 is a perspective view of a polygon having edges which are set at an angle to the axis of rotation according to a second embodiment of the invention.
Figure 7:
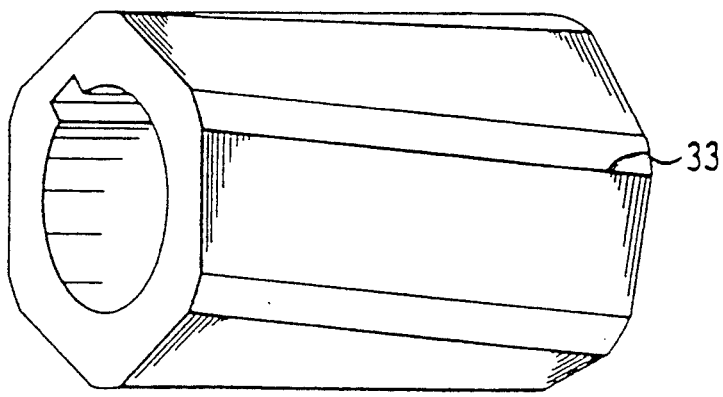
FIG. 7 is a perspective view of a polygon having edges which are at an angle to the axis of rotation according to a third embodiment of the invention.

FIGS. 5 to 7 show different designs of the polygon.

According to FIG. 5, the edges 31 of the polygon are oriented axis-parallel. FIGS. 6 and 7 involve edges 32 and 33 extending at a small angle opposite the respective polygon axis, where the edges 32 and 33 slope in the opposite direction. The slope is so small that the edges 32 and 33 extend only over a fraction of the course of a thread, which would result in an especially large pitch as edges 32 and 33 continue. Polygon edges 31, 32, 33 are substantially flat strips which are narrower in width than flat surfaces 27.

It has turned out that a design of the polygons with edges 25, as shown in FIG. 2, has an optimal effect, thus where the edges 25 slope in the same direction, since in this case the aforementioned effect of the wandering of the kneading operation is especially pronounced when one edge is placed opposite the respective other polygon.

It must also be pointed out that several polygon steps can be provided in succession along a multi-screw mixing and kneading machine, thus also more than the two steps, as shown in FIGS. 1 and 2. The number of polygon steps depends substantially on the material to be processed, in particular on the amount of heat to be generated thereby. It is also possible to shorten the polygons as compared to the drawing in FIGS. 1 and 2 and to provide instead a larger number of polygons steps in succession. However, it has been shown that within an individual polygon step an adequate kneading effect can be obtained only if the length of the polygon is greater than the diameter of their envelopes.

It must also be pointed out that also triple screw mixing and kneading machines, for example, with the axially extended polygons can be provided. In FIGS. 5 to 7 the polygons are shown as hollow shafts. In the actual construction, however, the cavity is filled by an anchor, which penetrates the respective entire shaft and transfers the drive torque.

I claim:

1. A multi-screw, continuous mixing and kneading machine comprising:
    a housing assembly including two adjoining and substantially cylindrical housing sections each having an inner wall;
    a screw element disposed within each of said adjoining housing sections such that the screw elements are axially adjacent each other and rotatable in the same direction about an axis of rotation, each screw element including a threaded transport screw and a kneading element, said threaded transport screws intermeshing;
    each said kneading element disposed within one of said housing sections and comprising axially extending polygons having edges and substantially flat surfaces, said edges during rotation circumscribing envelopes and diameters which have a small clearance with respect to one another such that the edges of said axially extending adjacent polygons do not overlap while rotating and a clearance is maintained between said polygons, and wherein a distance between the edges and said inner walls of the housing sections is significantly greater than said clearance.

2. The machine according to claim 1 wherein said polygons have an axial length which is greater than the diameter of the circumscribed envelopes.

3. The machine according to claim 2 wherein each of said screw elements further comprise baffle elements disposed axially adjacent said kneading elements on a side of the kneading elements opposite the kneaded transport screws.

4. A machine according to claim 2 wherein said edges of said polygons extend substantially parallel to the axis of rotation of said screw elements.

5. A multi-screw, continuous mixing and kneading machine comprising:
    a housing assembly including two adjoining and substantially cylindrical housing sections each having an inner wall;
    an inlet opening in said housing for feed of material to be mixed and kneaded and an outlet opening in said housing for discharge of said material;
    a screw element disposed within each of said adjoining housing sections such that the screw elements are axially adjacent each other and rotatable in the same direction about an axis of rotation, each screw element including a threaded transport screw, a kneading element and a threaded discharge screw, said threaded transport screws intermeshing and said threaded discharge screws intermeshing, said threaded transport screws disposed adjacent said inlet opening, said threaded discharge screws disposed axially between said threaded transport screws and said threaded discharge screws;

each said kneading element disposed within one of said housing sections and comprising axially extending polygons having edges and substantially flat surfaces, said edges during rotation circumscribing envelopes with diameters which have a small clearance with respect to one another such that the edges of said axially extending adjacent polygons do not overlap while rotation and a clearance is maintained between said polygons, and wherein a distance between the edges and said inner walls of the housing sections is significantly greater than said clearance.

6. The machine according to claim 5 wherein said polygons have an axial length which is greater than the diameter of the circumscribed envelopes.

7. The machine according to claim 6 wherein each of said screws elements further comprise baffle elements disposed axially adjacent said kneading elements on the side of the kneading elements opposite the threaded transport screws.

8. The machine according to claim 7 wherein said baffle elements comprise screws having an interrupted thread, the threads of said baffle elements being of opposite hand relative to said threaded transport screw.

9. The machine according to claim 8 wherein the baffle screws have an axial length which is shorter than the axial length of the threaded transport screws.

10. A machine according to claim 9 wherein each screw element has two kneading elements.

11. A machine according to claim 10 wherein each screw element has two baffle elements, one baffle element disposed axially adjacent each of the two kneading elements on a side of the kneading elements opposite the threaded transport screw.

12. A machine according to claim 6 wherein said edges of said polygons extend substantially parallel to the axis of rotation of said screw elements.

13. A machine according to claim 6 wherein the edges of said polygons extend axially at a small angle relative to the axis of rotation of said screw elements such that the edges extend over only a fraction of a complete course of rotation of a thread.

14. A machine according to claim 13 wherein for adjacent polygons the edges of said polygons extend axially at angles in the same direction in reference to a plane through their axis of rotation.

15. A machine according to claim 6 wherein for adjacent polygons the edges of said polygons extend parallel to each other in reference to a plane through their axis of rotation.

16. A machine according to claim 6 wherein a cross-section of said polygons taken perpendicular to their axis of rotation comprises an equilateral polygon.

17. A machine according to claim 16 wherein said equilateral polygon is a hexagon.

18. A machine according to claim 6 wherein said polygons comprise hollow shafts disposed about an anchor portion of said screw elements.

19. A multi-screw, continuous mixing and kneading machine comprising:

a housing assembly including two adjoining and substantially cylindrical housing sections each having an inner wall;

an inlet opening in said housing for feed of material to be mixed and kneaded and an outlet opening in said housing for discharge of said material;

a screw element disposed within each of said adjoining housing sections such that the screw elements are axially adjacent each other and rotatable in the same direction about an axis of rotation, each screw element including a threaded transport screw, a kneading element and a threaded discharge screw, said threaded transport screws intermeshing and said threaded discharge screws intermeshing, said threaded transport screws disposed adjacent said inlet opening, said threaded discharge screws disposed adjacent said outlet opening, said kneading elements disposed axially between said transport screws and said discharge screws;

each said kneading element disposed within one of said housing sections and comprising axially extending polygons having edges and substantially flat surfaces, said edges during rotation circumscribing envelopes with diameters which have a small clearance with respect to one another such that the edges of said axially extending adjacent polygons do not overlap while rotating and a clearance is maintained between said polygons, and wherein a distance between the edges and said inner walls of the housing sections is significantly greater than said clearance, said polygons have an axial length which is greater than the diameter of the circumscribed envelopes;

each of said screw elements further comprise baffle elements disposed axially adjacent said kneading elements on a side of the kneading elements opposite the threaded transport screws; said baffle elements comprise screws which have an axial length which is shorter than the axial length of the threaded transport screws and having an interrupted thread, the threads of said baffle elements being of opposite hand relative to said threaded transport screw;

the edges of said polygons extend axially at a small angle in the same direction relative to the axis of rotation of said screw elements such that the edges extend over only a fraction of a complete course of rotation of a thread.

* * * * *